Figure 1:
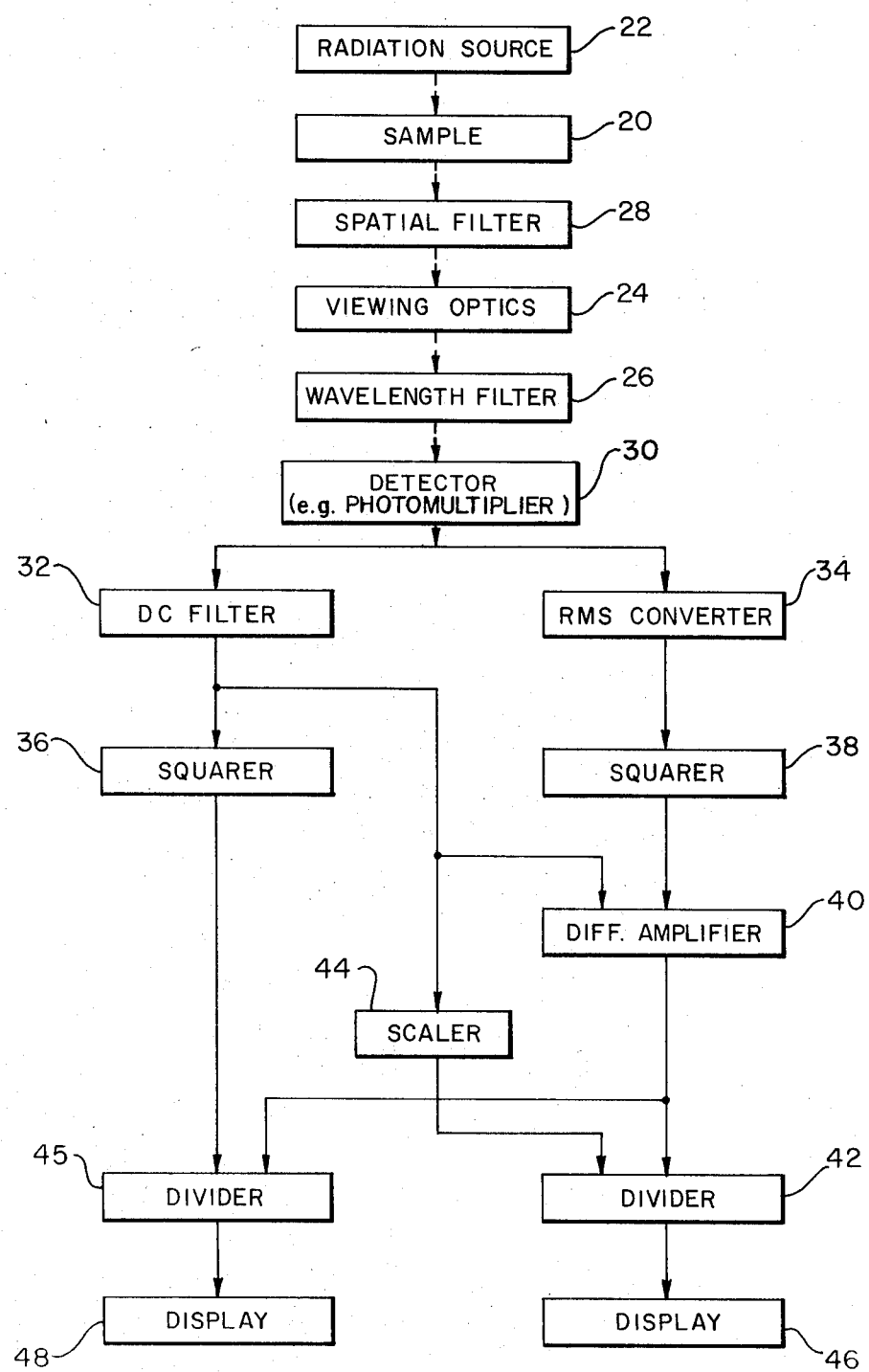

United States Patent [19]

Hirschfeld

[11] 3,859,526

[45] Jan. 7, 1975

[54] METHOD AND APPARATUS FOR DETECTING

[75] Inventor: Tomas Hirschfeld, Framingham, Mass.

[73] Assignee: Block Engineering, Inc., Cambridge, Mass.

[22] Filed: Oct. 23, 1973

[21] Appl. No.: 408,602

[52] U.S. Cl. ................. 250/302, 250/304, 250/373, 324/71 LC
[51] Int. Cl. ............................................. G01t 1/00
[58] Field of Search ........... 250/373, 461, 302, 303, 250/304; 328/143, 144; 356/39; 324/71 LC, 71 CP; 235/193.5, 92 PC

[56] References Cited
UNITED STATES PATENTS

| | | | |
|---|---|---|---|
| 3,497,690 | 2/1970 | Wheeless | 250/304 |
| 3,657,537 | 4/1972 | Wheeless | 250/302 |
| 3,727,048 | 4/1973 | Haas | 250/302 |

*Primary Examiner*—Harold A. Dixon
*Attorney, Agent, or Firm*—Schiller & Pandiscio

[57] ABSTRACT

Method and apparatus for detecting the statistical particle distribution and/or the average particle mass in a population of submicron fixed particles suspended in solution. The technique involves the modulation of emission, such as fluorescence, from the particles by virtue of their Brownian motion convolved with a spatial filter. An electrical signal corresponding to the modulated emission is analyzed to provide a first signal proportional to its DC level and a second signal proportional to the RMS value of the oscillatory components of the modulation. The statistical particle distribution and average mass are determined as functions of the foregoing first and second signals.

14 Claims, 2 Drawing Figures

METHOD AND APPARATUS FOR DETECTING

This invention relates to optical detection and classification of submicron-dimensioned particles, such as viruses, suspended in a fluid medium.

The detection and classification of submicron-dimensioned particles, particularly viruses, has long been an important goal frustrated by a number of vexing problems. One standard approach has been through electron microscopy, which cannot readily be used with free floating or "live" specimens, and requires elaborate, time-consuming sample preparation and very complex, expensive equipment.

In a known optical system, viral particles suspended in a fluid medium are illuminated with coherent light. Backscattered light from the particles is then observed by herodyne spectrometry to obtain data on the Brownian motion of the particles, which motion can then be correlated with the particle sizes. Briefly then, it is known to measure particle size by determining the Doppler broadening of scattered light.

In copending application Ser. No. 375,807 filed by Tomas Hirschfeld on July 2, 1973, and commonly assigned with the present application, there is disclosed a system which obviates some of the problems that have arisen in heterodyne spectroscopy. The Hirschfeld invention makes use of fluorescent staining to differentiate between different particle types. Since fluorescent emission is broad-band and not narrow-band, the use of Doppler broadening as a size discriminant is not feasible. Instead, the Hirschfeld system makes use of a spatial filter, such as an aperture, to modulate fluorescent emission from the particles moving under Brownian forces to produce a fluctuation spectrum which is a function of the velocities of the fluorescing particles. Because the velocity of the particles is a function of their hydrodynamic radius, a Fourier analysis of the modulation will permit classification by size of the observed particles.

In copending application Ser. No. 401,207 filed by Myron J. Block, and commonly assigned with the present application, there is disclosed an improvement on the Hirschfeld system. An optimum aperture for sizing viruses with reasonable accuracy with the Hirschfeld system is around approximately one-tenth of a wavelength. Such aperture clearly cannot be attained with standard optical techniques because of diffraction limitations. The Block improvement provides an "aperture" of the requisite dimensions by employing an attenuated total reflective cell in conjunction with the fluid specimen being examined. By illuminating the specimen with the evanescent wave provided by such a cell, one effectively obtains an aperture of desired dimension. Again, information as to size can be obtained from the output signal in the Block system by making a Fourier analysis of the modulated emission from the particles.

It has now been discovered that radiant emission from randomly moving particles in suspension, modulated by the random motion provides signals from which one may obtain substantial information regarding the number and mass of the particles. A principal object of the present invention is therefore to provide apparatus for and a method of obtaining such information.

To effect the foregoing and other objects, the present invention generally comprises photometric means for providing radiant emissions from randomly moving particles and detection or transducer means for converting the radiant emission into corresponding electrical signals. The electrical signals are divided into a "DC" or steady state component and an "AC" or oscillatory component. An electrical signal level is provided which is the root mean square value of the AC component. From the two resulting signals, the DC level and the RMS level, one can determine, as delineated hereinafter, values proportional to the statistical particle distribution, i.e., number of particles per unit volume of the sample, and the average radiating mass per particle.

Figure 2:
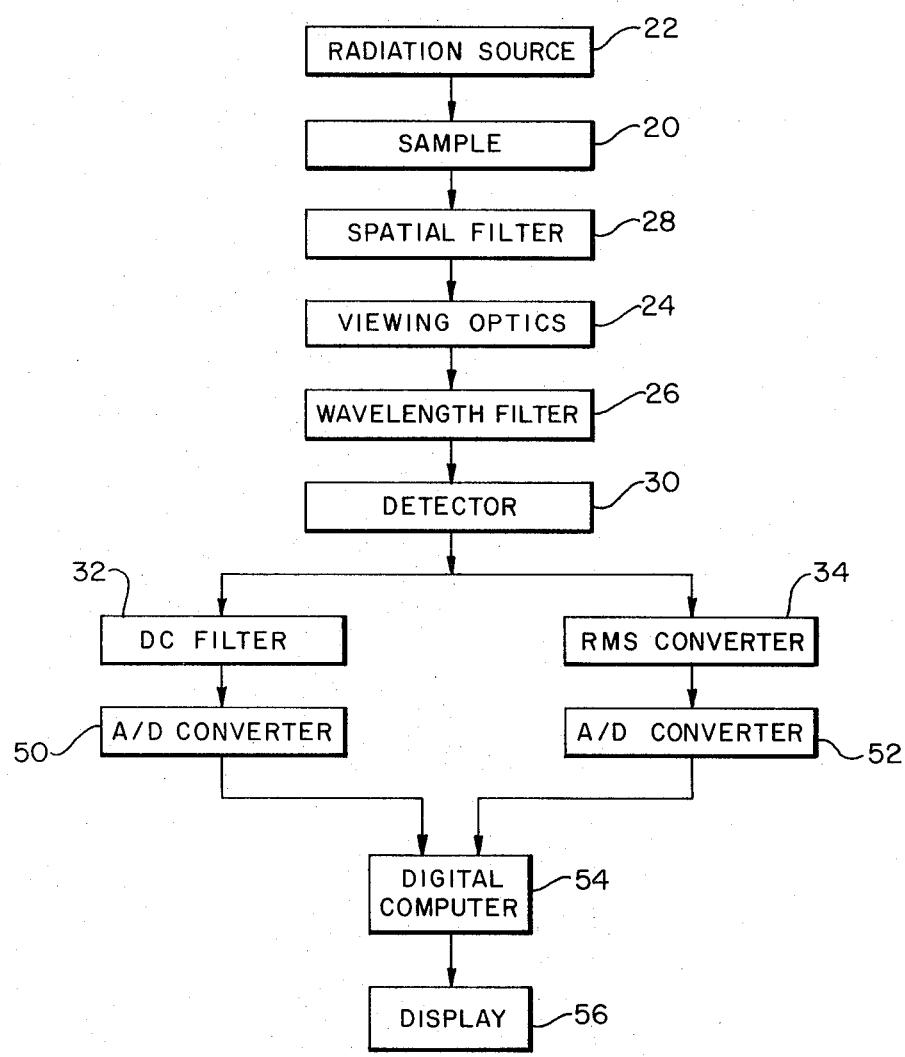

Other objects of the present invention will in part be obvious and will in part appear hereinafter. The invention accordingly comprises the apparatus possessing the construction, combination of elements, and arrangement of parts, and the method comprising the several steps and the order and relation thereof, all of which are exemplified in the following detailed disclosure, and the scope of the application of which will be indicated in the claims. For a fuller understanding of the nature and objects of the present invention, reference should be had to the following detailed description taken in connection with the accompanying drawings wherein:

FIG. 1 is a block diagram of one embodiment of the principles of the present invention and FIG. 2 is a block diagram of yet another version of the apparatus of the present invention.

Radiation emitted by a minute particle in suspension and detected by an optical system will tend to be modulated radiation for the reasons hereinafter noted. Such radiant emission can be produced in response to excitation radiation, i.e., by way of fluorescence, or reflection (scattering) or the like, or can be radiation emitted by decay processes such as radioactive emission from tracer elements. It will be appreciated that any optical system has an entrance or viewing aperture and that such aperture necessarily is bounded. As the particles move across such a boundary by random or Brownian motion, the emission from the particles will appear to be modulated (i.e., either be seen or not be seen by the optical system). The modulation produced can therefore be described as a convolution of the random particle motion with the boundary characteristics of the aperture. For example, consider an optical system with a field stop with ordinary rectangular edges. The edges will have boundary characteristics which are $sinc^2$ (i.e., $[\sin X/X]^2$ in nature). Convolution of the random motion and such $sinc^2$ boundary will result in a Lorentzian curve. Similarly, some boundaries will exhibit $1/e$ edge characteristics which when convolved with random motion will produce an exponential curve.

To obtain a particular modulation function, one is not limited to the nature of the aperture boundaries of the optical system employed. Explicit spatial filtering, for example in the form of gratings, grids, annuli and the like each of which defines an edge or boundary between one or more radiation transmitting elements and one or more relatively non-transmitting elements, can be employed to provide the boundary characteristics. Such as explicit spatial filter can be introduced between the particles and an exciting beam of radiation, or between the particles and the viewing optical system.

In any event, it will be apparent that the emission from the random particles, as thus modulated, will contain a substantial amount of information, as previously noted, which relates to particle velocity, distribution and mass.

In describing the invention, reference will be made to the use of the phenomena of fluorescence to provide the radiant emission, but it would be understood that the invention is not so limited. Thus, with reference to FIG. 1 typically, sample 20 of particles in a fluid medium is initially provided and steps are preferably taken to limit the population in that sample to a desired species of particle. For example, if the desired particles are viral, the sample is stained with a complex, nucleic acid-specific stain, which selectively fluorochromes all nucleic acid-containing particles and molecules. In a typical biological sample the stained particles will thus include whole cells, mitochondrae, chromosomes, ribosomes, messenger and transfer RNA as well as viruses. The first three, being much larger in size than even the largest viruses, may be efficiently rejected by filtering the sample through a Millipore filter; the last two, much smaller in molecular weight than the smallest viruses, can be wholly eliminated by rapid dialysis in a hollow fiber. Thus, there is provided sample 20 in which the only fluorescent particles are the viruses, ribosomes, the very largest messenger RNA and some fragments of larger particles. Sample 20 is placed in a limiting, preferably transparent container such as the well of the microscope slide.

Source 22 of exciting radiation is provided for inducing fluorescence in the dyed particles in sample 20, and of course is positioned so as to appropriately illuminate sample 20.

Viewing optics 24 are disposed for observing radiant mission from fluorescing particles in sample 20. As means for discriminating between the scattered excitation radiation and the fluorescent emission, optics 24 may have associated therewith an appropriate wavelength filter 26. In the preferred embodiment, in order to increase the extent of the modulation, spatial filter 28 is provided, and typically placed between the sample and the viewing optics, although as earlier noted, the spatial filter can also be disposed between source 22 and sample 20. As means for converting the modulated fluorescent emissions from the particles in sample 20 into electrical signals, detector 30 is provided coupled to the output aperture of viewing optics 24.

In a typical embodiment, the nucleic acid-containing particles in sample 20 will have been dyed with a fluorescent dye for example a phenanthridinium dye such as ethydium bromide which imparts a strong red fluorescence to nucleic acids. A typical example of the latter dye is 2,7 diamino-10 ethyl-9 phenyl phenanthridinium bromide and a number of derivatives thereof. Thus radiation source 22 is typically a laser which provides an exciting beam in the wavelength range of 480 to 550 m$\mu$. The dyed nucleic acids in sample 20 will then fluoresce in a wavelength range of 580 to 650 m$\mu$ and wavelength filter 26 should be selected to pass only the fluorescent emissions and to screen out any scattered radiation from source 22.

Spatial filter 28 is typically then a simple line screen, or one or more apertures of sufficient size to substantially avoid diffraction effects. Alternatively of course, this spatial filter can be an ATR aperture of the type described in aforesaid copending application Ser. No. 375,807. Obviously, detector 30 preferably is a photodetector, preferably a high gain photomultiplier the target of which is sensitive to radiation in the wavelength band passed by filter 26. Viewing optics 24 conveniently can be any of a number of commercially available microscopes.

The output electrical signal from detector 30 is coupled to both the input of DC filter 32 and RMS converter 34. The DC filter typically is a circuit such as that described in *Standard Handbook for Electrical Engineers*, 10th ed., Fink et al., McGraw-Hill Company, pp. 254–260 inclusive. The RMS converter typically is a circuit similar to that described in U.S. Pat. 3,564,389 issued Feb. 16, 1971 to Peter L. Richman. It will be apparent that filter 32 and converter 34 respectively serve to separate the steady state from the oscillatory components in the electrical output signal from detector 30. The DC filter by rejecting any AC input, provides an output which is as well known, a substantially steady state signal which has a magnitude proportional to the steady state components of its input signal. Similarly, the output of converter 34 is a substantially steady state signal which is proportional to the instantaneous RMS value of the oscillatory components in the input signal to the converter.

The output of filter 32 is connected to squarer circuit 36 which provides an output having a value proportional to the square of the magnitude of its input signal. A similar squarer 38 is connected to the output of converter 34. Such squarers typically are circuits such as are described in *Operational Amplifiers*, Graeme et al., McGraw-Hill Company (1971), p.280.

The circuit of the present invention also includes differential amplifier 40 having a pair of inputs, one of which is connected to the output from DC filters 32 and the other of which is connected to the output from squarer 38. Such differential amplifiers are described in *Operational Amplifiers*, supra, pp. 201–207 inclusive. The output of differential amplifier 40 is connected to one input of divider 42. The output of DC filter 32 is also connected through scaler 44 to the other input of divider 42. Another divider 45 is also provided, its inputs being respectively connected to the outputs of squarer 36 and differential amplifier 40. Such dividers are also described in *Operational Amplifiers*, supra, page 279. Scaler 44 as well known in the art, is simply an operational amplifier in which the ratio of input and feedback impedances is set to provide a predetermined gain so that the output of scaler 44 is a fixed multiple of its input.

The outputs from dividers 42 and 45 are respectively fed into displays 46 and 48. The latter typically can be analog display systems such as coil meters, digital display systems with appropriate analog-to-digital converters at their input, or can be complex data processors with cathode ray oscilloscopic displays or mechanical print-out systems or the like.

The operation of the circuitry connected to the output of detector 30 can conveniently be described in connection with the following analysis. The steady state component $\overline{T}$ in the modulated emission from sample 20, as translated into the output of detector 30, can be expressed as follows:

$$\overline{T} = KM\overline{N} \qquad (1)$$

where $\overline{T}$ is the average total DC signal in the output of detector 30, $K$ is a coefficient depending inter alia, upon the optical properties of the system, $M$ is the mass of dye bound to each particle in sample 20, and $\overline{N}$ is the average number of particles seen by the optical system during the time that signal T subsists, i.e., the statistical particle distribution.

Similarly, one can define the root mean square valve, R, of the modulation in the fluorescent emission from the particles in sample 20 as $$\sqrt{R} = \sqrt{(\sqrt{\overline{T}})^2 + (KM\sqrt{\overline{N}})^2} \quad (2)$$

Solving equation (2) for $\overline{N}$ one obtains $$\overline{N} = \overline{T}^2/R^2 - \overline{T}$$

Substituting equation (3) into equation (1) and solving for M one obtains $$M = R^2 - \overline{T}/K\overline{T} \quad (4)$$

With reference again to FIG. 1, it will be seen that the outputs from DC filter 32 and RMS converter 34 are respectively proportional to $\overline{T}$ and R in the above equations. Thus, the outputs from squarers 36 and 38 are respectively $\overline{T}^2$ and $R^2$. The output from differential amplifier 40, assuming appropriately connected inputs is then $R^2 - \overline{T}$. Upon setting the output from differential amplifier 40 as the denominator input to divider 44 and the output from squarer 36 as the numerator input to divider 44, the output of the latter will be proportional to $\overline{N}$ as described in equation (3) above.

The coefficient provided by scaler 44 should be set to be proportional to K. Using the output, KT, from scaler 44 as the denominator input to divider 42, the numerator input to the latter being the output from differential amplifier 40, it will be seen that the output from divider 42 is proportional to M as defined in equation (4) above. Thus, from observation and analysis of radiant emissions which are modulated by the convolution of the random motion of the emitting particles with the boundary conditions imposed by a spatial filter, one can obtain a measure of either or both the statistical particle distribution and the mass of the particles. It should be noted that viral particles all include a nucleic acid, either ribonucleic acid (RNA) or deoxyribonucleic acid (DNA), and that there are known fluorescent dyes which are specific to either or both DNA or RNA. Because all the virus particles of a given type of virus have identical nucleic acid constitution in type and amount, it is postulated that the number of dye molecules which will bind to a particular type of viral particle is a constant depending on the amount of nucleic acid in that viral type. Because the amount of bound dye is then proportional to the mass of the particle, a measure of the mass of the fluorescing dye for each particle is then proportional to the mass of the particle itself (neglecting of course non-nucleic acid portions of the viruses, which portions are believed to constitute a minor amount of the viral mass).

The embodiment of the invention described in FIG. 1 will be recognized as an analog system. Clearly, one can achieve similar results using a digital system of the type shown in FIG. 2 wherein like numerals denote like parts.

Referring now to FIG. 2 it will be seen that the latter includes the same sample 20 illuminated by radiation source 22, so that the output radiation from the sample particles is viewed by optics 24 through spatial filter 28 and wavelength filter 26, detector 30 then providing the same modulated output electrical signal. Again, as in the embodiment of FIG. 1 output utput signal from detector 30 is analyzed by filter 32 and RMS converter 34 respectively to provide a steady state value from converter 32 proportional to the DC or steady state component in the output signal from detector 30 and a steady state value from converter 34 which is proportional to the instantaneous RMS value of the oscillatory components in the output of detector 30. The device of FIG. 2 also includes a pair of analog-to-digital converters 50 and 52 each for providing a digital signal having a value proportional to the magnitude of the input analog signal thereto. Such converters are respectively connected to the outputs from converter 32 and converter 34. The output signal from converters 50 and 52 are typically either a serial or parallel train of pulses or digital bits. Such converters are well known in the art and are particularly described in the text *Electronic Analog/Digital Converters*, H. Schmid, Van Nostrand Reinhold Company, 1970. The output signal from such converters are particularly adapted for use in computation and therefore the outputs from converters 50 and 52 may be connected to digital computer 54. The latter is typically a mini-computer of the type manufactured by a number of companies such as Digital Equipment Corporation, Maynard, Mass. under the trade designation PDP-8, Data General Corporation, Southbridge, Mass. under the trade designation Nova II, and many others. Such computers can be very simply programmed to make the computations defined by equations (4) and (5) above. Coupled to the output of such a computer is a display 56, such as an impact printer or the like upon which the results of the computations are provided.

Since certain changes may be made in the above method and apparatus without departing from the scope of the invention herein involved, it is intended that all matter contained in the above description or shown in the accompanying drawing shall be interpreted in an illustrative and not in a limiting sense.

What is claimed is:

1. Apparatus for determining characteristics of a sample of radiantly emissive submicron-sized particles suspended in a fluid medium; and comprising in combination;

means for detecting radiant emission from said particles, means for converting said radiant emission into an electrical signal, means for determining the value of the amplitude of any substantially steady-state component of said signal, means for determining the root mean square value of the amplitude of any oscillatory components of said signal, and means for determining, as a function of the values of both said steady state and oscillatory components, either or both of the values of the average mass per unit particle and the statistical distribution of said particles in said sample.

2. Apparatus as defined in claim 1 including a spatial filter for modulating said radiant emission.

3. Apparatus as defined in claim 1 including means for exciting said particles into radiant emission.

4. Apparatus as defined in claim 3 wherein said means for exciting comprises a laser.

5. Apparatus as defined in claim 3 wherein said means for exciting comprises a source of radiation, said apparatus including a wavelength filter for discriminating against the wavelengths of radiation from said source while passing said radiant emission to said means for converting.

6. Apparatus as defined in claim 1 wherein said means for detecting comprises an optical system for viewing said radiant emission incident thereon.

7. Apparatus as defined in claim 1 wherein said means for converting is a photomultiplier.

8. Apparatus as defined in claim 1 wherein said means for determining the value of any substantially steady-state component is a DC filter for providing a first substantially steady-state output signal having a value proportional to the value of the magnitude of said steady-state component, and said means for determining the value of any oscillatory components is a converter, for providing a second substantially steady-state output signal having a value proportional to the root mean square value of the amplitude of said oscillatory components.

9. Apparatus as defined in claim 8 wherein said means for determining the value of said mass comprises
means for squaring the amplitude of said first steady-state signal to provide a first squared signal,
means for deriving a difference signal between the amplitude of said first squared signal and the amplitude of said second steady-state signal,
means for amplifying said second steady-state signal by a predetermined fixed gain, and
means for ratioing said difference signal with respect to the amplified second steady-state signal to provide a ratio proportional to said mass.

10. Apparatus as defined in claim 8 wherein said means for determining said distribution comprises,
means for squaring the amplitude of said first steady-state signal to provide a first squared signal,
means for deriving a difference signal between the amplitude of said first squared signal and the amplitude of said second steady-state signal,
means for squaring the amplitude of said second steady-state signal to provide a second squared signal, and
means for ratioing said second squared signal with respect to said difference signal to provide a ratio proportional to said distribution.

11. Method of determining the average mass of sub-micronsized particles suspended in a fluid medium and providing radiant emission modulated by Brownian motion of said particles; said method comprising the steps of
converting the modulated radiant emission into an electrical signal,
determining the value of the amplitude of any substantially steady-state component of said signal,
determining the root mean square value of the amplitude of any oscillatory components of said signal, and
determining, as a function of said values both said components, the average mass per unit particle.

12. Method as defined in claim 1 wherein said function is proportional to the ratio of (a) the difference between the square of said root mean square value and said value of the amplitude of said steady-state component with respect to (b) the product of value of said amplitude of said steady-state component and a predetermined coefficient.

13. Method of determining the statistical particle distribution in a sample of submicron-sized particles suspended in a fluid medium and emitting radiation modulated by the Brownian motion of the particles; and method comprising the steps of
converting the modulated radiant emission into an electrical signal,
determining the value of the amplitude of any substantially steady-state component of said signal,
determining the root mean square value of the amplitude of any oscillatory component of said signal, and
means for determining, as a function of said values of both said components, the value of the statistical distribution of said particles in said sample.

14. Method as defined in claim 13 wherein said function is proportional to the ratio of (a) the square of the value of said amplitude of said steady-state component, with respect to (b) the difference between the square of said root mean square value and said value of the amplitude of said steady-state component.

* * * * *

UNITED STATES PATENT OFFICE
CERTIFICATE OF CORRECTION

Patent No. 3,859,526          Dated January 7, 1975

Inventor(s) Tomas Hirschfeld

It is certified that error appears in the above-identified patent and that said Letters Patent are hereby corrected as shown below:

Claim 11, Column 8, line 17, after the word "values" insert -- of --.

Claim 12, column 8, line 19, delete "1" and insert -- 11 --.

Signed and sealed this 18th day of March 1975.

(SEAL)
Attest:

RUTH C. MASON
Attesting Officer

C. MARSHALL DANN
Commissioner of Patents
and Trademarks